US012651706B2

(12) United States Patent
Ko

(10) Patent No.: US 12,651,706 B2
(45) Date of Patent: Jun. 9, 2026

(54) MULTILAYER CERAMIC CAPACITOR AND METHOD OF MANUFACTURING THE SAME

(71) Applicant: SAMSUNG ELECTRO-MECHANICS CO., LTD., Suwon-si (KR)

(72) Inventor: Yoonbin Ko, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 98 days.

(21) Appl. No.: 18/593,693

(22) Filed: Mar. 1, 2024

(65) Prior Publication Data

US 2024/0339268 A1      Oct. 10, 2024

(30) Foreign Application Priority Data

Apr. 5, 2023      (KR) ......................... 10-2023-0044775

(51) Int. Cl.
*H01G 4/30*          (2006.01)
*H01G 4/008*        (2006.01)
(Continued)

(52) U.S. Cl.
CPC .............. *H01G 4/30* (2013.01); *H01G 4/008* (2013.01); *H01G 4/012* (2013.01); *H01G 4/12* (2013.01); *H01G 4/224* (2013.01); *H01G 4/232* (2013.01)

(58) Field of Classification Search
CPC .......... H01G 4/30; H01G 4/008; H01G 4/012; H01G 4/12; H01G 4/224; H01G 4/232
See application file for complete search history.

(56) References Cited

U.S. PATENT DOCUMENTS

2014/0020942 A1*    1/2014    Cho ....................... H05K 1/181
                                                                    361/301.4
2014/0326493 A1*   11/2014    Lee ...................... H05K 1/0306
                                                                    361/301.4
(Continued)

FOREIGN PATENT DOCUMENTS

JP          2018-190952 A      11/2018
JP          2021-174822 A      11/2021
(Continued)

*Primary Examiner* — Michael P McFadden
(74) *Attorney, Agent, or Firm* — Morgan, Lewis & Bockius LLP

(57) ABSTRACT

A multilayer ceramic capacitor includes: a capacitor body including dielectric layers, and first and second internal electrodes alternately disposed in the first direction with the dielectric layers interposed therebetween; and external electrodes including base electrodes disposed on outer sides of the capacitor body and connected to the first and the second internal electrodes, and conductive resin layers disposed on outer sides of the base electrodes. The external electrodes include: connection portions; side portions extending from the connection portions; first band portions including first portions extending from the connection portions, and second portions extending from the first portions to the side portions; and second band portions extending from the connection portions and then extending to the side portions, and the conductive resin layers disposed in the second portions of the first band portions include protruding portions that protrude further than the first portions along the first direction of the capacitor body.

13 Claims, 10 Drawing Sheets

(51) Int. Cl.
  *H01G 4/012*   (2006.01)
  *H01G 4/12*    (2006.01)
  *H01G 4/224*   (2006.01)
  *H01G 4/232*   (2006.01)

(56)     References Cited

U.S. PATENT DOCUMENTS

| | | | | |
|---|---|---|---|---|
| 2015/0041193 | A1* | 2/2015 | Lee | H01G 4/12 |
| | | | | 174/258 |
| 2018/0323010 | A1 | 11/2018 | Park et al. | |
| 2020/0029438 | A1 | 1/2020 | Sasaki | |
| 2021/0335542 | A1* | 10/2021 | Matsushita | H01G 2/065 |
| 2021/0335550 | A1* | 10/2021 | Ikeda | H01G 4/30 |
| 2023/0093850 | A1* | 3/2023 | Yatagawa | H01G 4/012 |
| | | | | 361/301.4 |
| 2023/0119320 | A1* | 4/2023 | Tamatani | H01F 27/29 |
| | | | | 361/540 |

FOREIGN PATENT DOCUMENTS

| | | | |
|---|---|---|---|
| JP | 2021-174856 | A | 11/2021 |
| JP | 7089426 | B | 6/2022 |

* cited by examiner

MULTILAYER CERAMIC CAPACITOR AND METHOD OF MANUFACTURING THE SAME

CROSS-REFERENCE TO RELATED APPLICATIONS

This application claims priority to and the benefit of Korean Patent Application No. 10-2023-0044775 filed in the Korean Intellectual Property Office on Apr. 5, 2023, the entire contents of which are incorporated herein by reference.

BACKGROUND

1. Technical Field

The present disclosure relates to a multilayer ceramic capacitor and a method of manufacturing the same.

2. Description of the Related Art

Multilayer ceramic capacitors (MLCCs) are mainly used in small terminals of which portability is important, such as smartphones, because they are small and highly reliable. Recently, as the high performance and the high integration of electronic devices have increased the number of multilayer ceramic capacitors (MLCCs) used in sets as well as the capacitance of each capacitor, the problem of acoustic noise caused by piezoelectricity has emerged as an important issue.

The multilayer ceramic capacitor (MLCC) may have a structure in which internal electrodes of different polarities are alternately stacked with a plurality of dielectric layers interposed therebetween. Since such dielectric layers have piezoelectricity and electrostriction, when a voltage is applied to the multilayer ceramic capacitor (MLCC), a piezoelectric phenomenon may occur between the internal electrodes, resulting in vibration. The vibration is transferred to a circuit board on which the multilayer ceramic capacitor (MLCC) is mounted. As a result, the entire circuit board becomes an acoustic reflection surface, generating acoustic noise.

SUMMARY

The present disclosure attempts to provide a multilayer ceramic capacitor and a method of manufacturing the same capable of not only reducing acoustic noise but also increasing mass production efficiency and reducing production cost.

However, the problem to be solved by the embodiments is not limited to the above-described problem and may variously extend within the scope of the technical idea included in the present disclosure.

An embodiment of the present disclosure provides a multilayer ceramic capacitor including: a capacitor body having first and second surfaces facing each other in a first direction, third and fourth surfaces facing each other in a second direction and connecting the first and second surfaces to each other, and fifth and sixth surfaces facing each other in a third direction, connecting the first and second surfaces to each other, and connecting the third and fourth surfaces to each other, the capacitor body including dielectric layers, and first and second internal electrodes alternately disposed in the first direction with one of the dielectric layers interposed between one of the first internal electrodes and one of the second internal electrodes; and external electrodes each including a base electrode disposed on an outer side of the capacitor body and connected to the first internal electrodes or the second internal electrodes, and a conductive resin layer disposed on an outer side of the base electrode, the external electrodes each including: a connection portion covering the third surface or the fourth surface; a side portion extending from the connection portion to cover (i) a partial portion of the fifth surface and ends thereof or (ii) sixth surface and ends thereof; a first band portion including: a first portion extending from the connection portion to cover a partial portion of the first surface and ends thereof, and a second portion extending from the first portion to the side portion; and a second band portion extending from the connection portion to cover a partial portion of the second surface and ends thereof and extending to the side portion, where the conductive resin layer disposed in the second portion include a protruding portion that protrudes further than the first portion along the first direction of the capacitor body.

The capacitor body may have no protruding portion corresponding to the protruding portion included in the conductive resin layer.

A maximum value of a thickness of the conductive resin layer disposed in the first portion of the first band portion may be 10 μm or less, the thickness of the conductive resin layer is measured from an outer surface of the base electrode on which the conductive resin layer is disposed to an outer surface of the conductive resin layer in a direction perpendicular to the outer surface of the base electrode.

The side portion may include a first side portion extending from the connection portion to cover a partial portion of the fifth surface and ends thereof, and a second side portion extending from the connection portion to cover a partial portion of the sixth surface and ends thereof, and the protruding portion may include a first protruding portion protruding from the second portion of the first band portion which extends to the first side portion, and a second protruding portion protruding from the second portion of the first band portion which extends to the second side portion.

A distance between a fixed end of the first protruding portion and a fixed end of the second protruding portion measured along the third direction may be 80% or more and 95% or less of a length of the first band portion measured along the third direction.

At least a part of the protruding portion may have portions disposed on the first surface.

A width of the protruding portion measured along the second direction at a fixed end of the protruding portion may be equal to a width of the first band portion measured along the second direction at the fixed end of the protruding portion.

A height of the protruding portion measured along the first direction may be in a range of 5% or more and 20% or less of a height measured along the first direction from an outer surface of each of the second band portions to a free end of the protruding portion.

The capacitor body may include a cover region disposed between (i) the first surface and (ii) one of the first internal electrodes or the second internal electrodes, and the cover region may include a portion having a different color from the dielectric layers disposed between the first internal electrodes and the second internal electrodes.

The cover region may include magnesium or vanadium.

The conductive resin layer disposed in the second band portion may further include third and fourth protruding portions protruding along the first direction in a direction opposite to the direction in which the first and second protruding portions protrude.

The third protruding portion and the fourth protruding portion may correspond to the first protruding portion and the second protruding portion, respectively.

The protruding portion may have a tapered end that points in the first direction.

Another embodiment of the present disclosure provides a method of manufacturing a multilayer ceramic capacitor, the method including: forming a capacitor body including internal electrodes stacked with dielectric layers interposed therebetween, the capacitor body having first and second surfaces facing each other in a first direction in which the internal electrodes are stacked, and third and fourth surfaces facing each other in a second direction and connecting the first and second surfaces to each other; forming base electrodes to be connected to the internal electrodes; forming a laminate that forms a conductive resin layer on each of the base electrodes; and forming a protruding portion by pressing a central portion of the laminate disposed on the first surface of the capacitor body.

The protruding portion may be formed on both side surfaces of the laminate in a third direction of the capacitor body.

The method may further include forming the conductive resin layer by curing the laminate, wherein the laminate includes a conductive paste including epoxy, and the pressing of the central portion of the laminate is performed with a flat molding body before the curing of the laminate.

The flat molding body may have a width larger than a width of the conductive resin layer measured in the second direction of the capacitor body.

The flat molding body may have a length of 80% or more and 95% or less of a length of the conductive resin layer measured in a third direction of the capacitor body.

The method may further include forming the conductive resin layer by curing the laminate. The laminate may include a conductive paste including epoxy, and the forming of the protruding portion may include shaving off the laminate via lapping after the curing of the laminates.

The laminate may include a conductive sheet including epoxy, and the forming of the protruding portion may include shaving off the laminate via lapping.

The multilayer ceramic capacitor and the method of manufacturing the same according to the embodiments are capable of suppressing transfer of vibration from the multilayer ceramic capacitor to a substrate, so that acoustic noise can be reduced while mass production efficiency can be secured and production cost can be reduced.

However, it is obvious that the effects of the embodiments are not limited to the above-described effects, and may variously extend without departing from the spirit and the scope of the present disclosure.

BRIEF DESCRIPTION OF THE DRAWINGS

FIG. 3 is a cross-sectional view taken along line III-III' in FIG. 1.

FIG. 4 is a cross-sectional view taken along line IV-IV' in FIG. 1.

DETAILED DESCRIPTION

Figure 1:
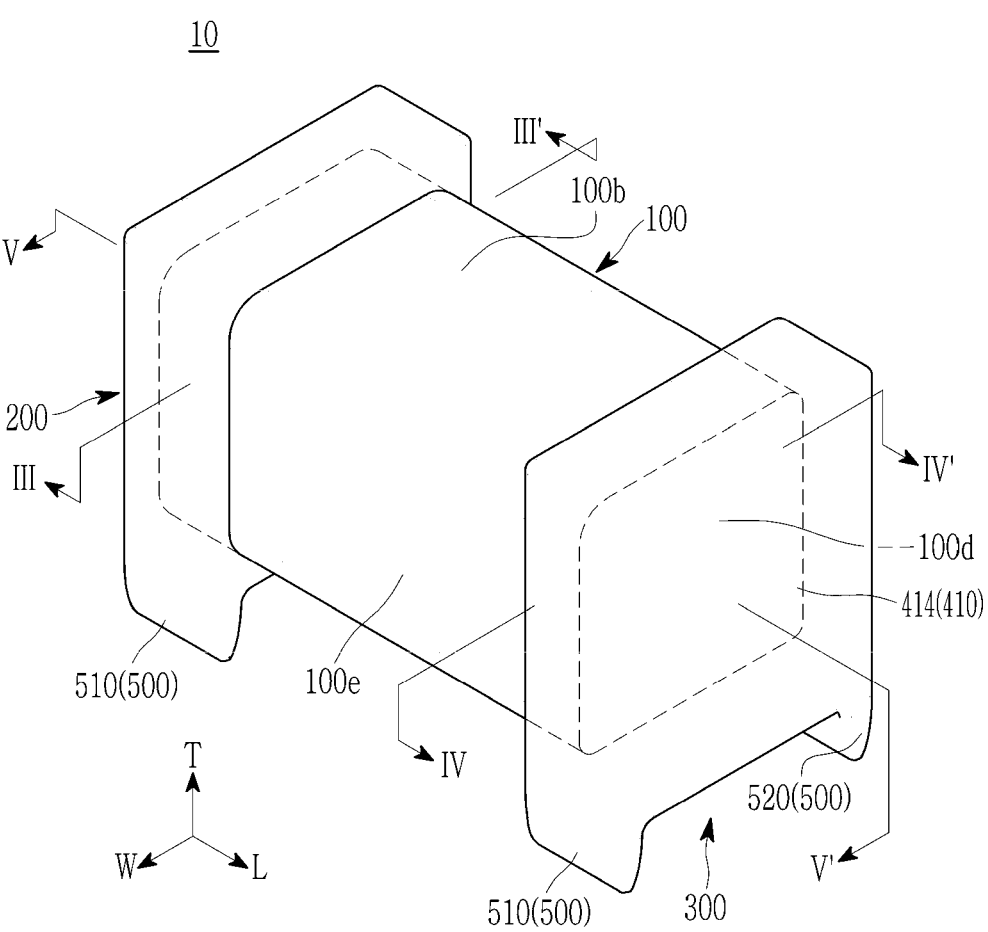
FIG. 1 is a perspective view illustrating an appearance of a multilayer ceramic capacitor according to an embodiment.

Hereinafter, embodiments of the present disclosure will be described in detail with reference to the accompanying drawings so that they can be easily carried out by those of ordinary skill in the art to which the present disclosure pertains. In order to clearly describe the present disclosure, parts irrelevant to the description are omitted in the drawings, and the same or similar components will be denoted by the same reference signs throughout the specification. In the accompanying drawings, some components are exaggerated, omitted, or schematically illustrated, and a size of each component does not entirely reflect the actual size.

The accompanying drawings are provided only to help easily understand the embodiments disclosed in the present specification, and it should be understood that the technical spirit disclosed in the present specification is not limited by the accompanying drawings, and the present disclosure includes all modifications, equivalents, and substitutions falling within the spirit and the technical scope of the present disclosure.

Terms including ordinal numbers such as first and second may be used to describe various components, but these components are not limited by these terms. These terms are used only for the purpose of distinguishing one component from another component.

In addition, when a part such as a layer, a film, a region, or a plate is referred to as being "on" another part, it may be "directly on" another part or there may be an intervening part therebetween. In contrast, when a part is referred to as being "directly on" another part, there is no intervening part therebetween. In addition, when a part is referred to as being "on" a reference part, it is located on or under the reference part, and does not necessarily mean that it is located "on" the reference part in the opposite direction of gravity.

It should be understood that terms "include", "have", and the like used throughout the specification specify the presence of features, numerals, steps, operations, components, parts mentioned in the specification, or a combination thereof, but do not preclude the presence or addition of one or more other features, numerals, steps, operations, components, parts, or a combination thereof. Therefore, when a certain part is referred to as "including" a certain component, this implies the presence of other components, not precluding the presence of other components, unless explicitly stated to the contrary.

In addition, throughout the specification, the phrase "in a plan view" means when a target part is viewed from above, and the phrase "in a cross-sectional view" means when a cross section of a target part as vertically cut is viewed laterally.

In addition, throughout the specification, the expression "connected" means that two or more components are connected to each other not only in a direct manner but also in an indirect manner through another component, means that two or more component are connected to each other not only physically but also electrically, or means that two or more components are integrally formed even though they are referred to by different terms based on their positions and functions.

Figure 2:
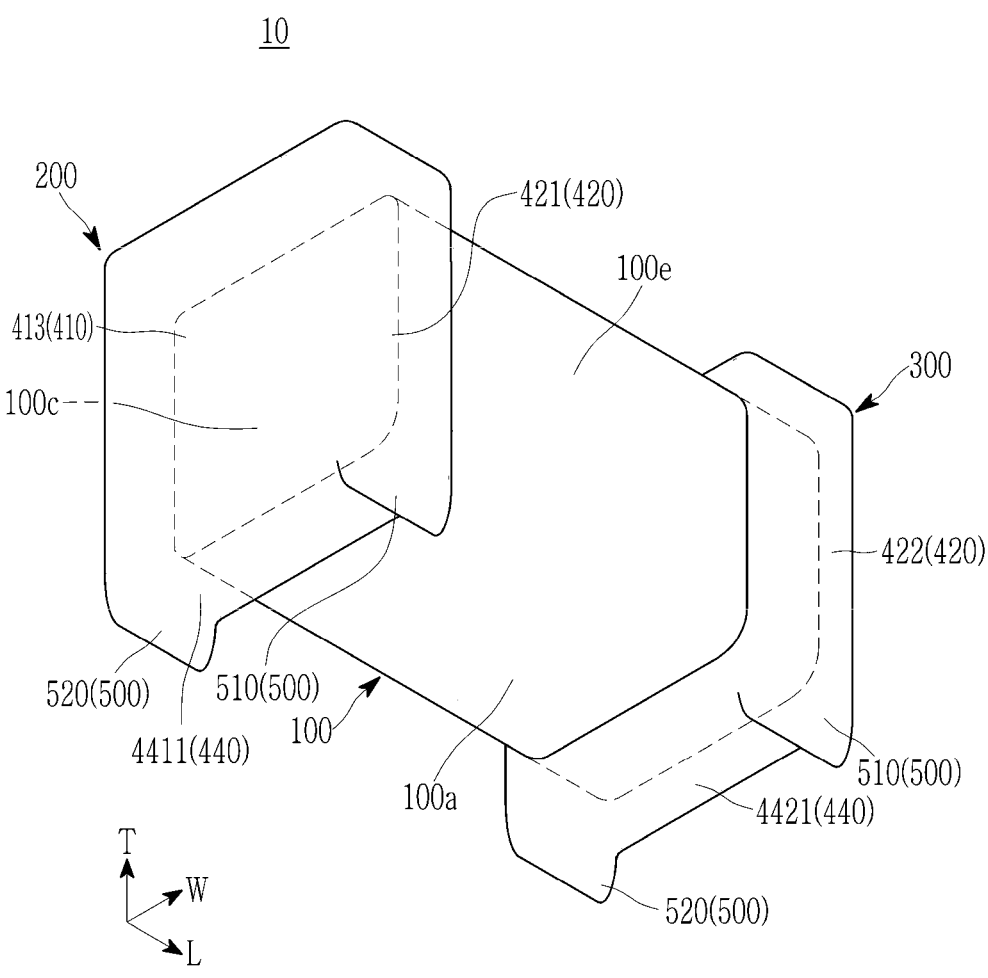
FIG. 2 is a bottom perspective view illustrating the multilayer ceramic capacitor of FIG. 1.
Figure 3:
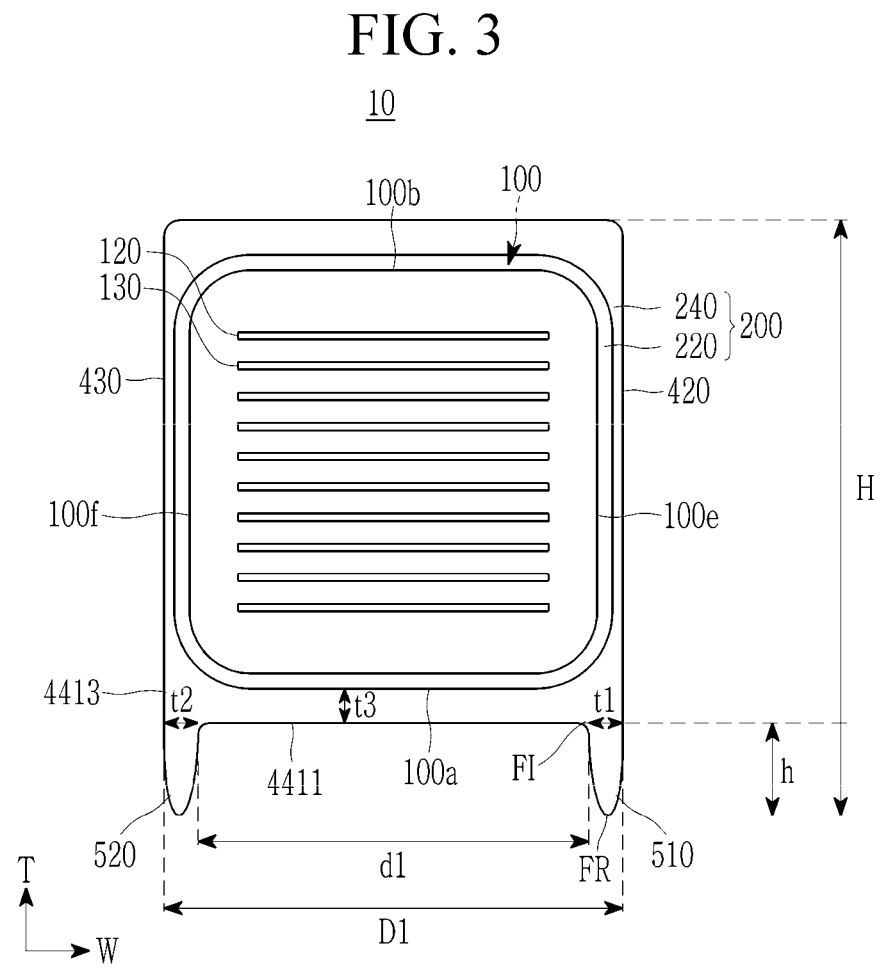
Figure 4:
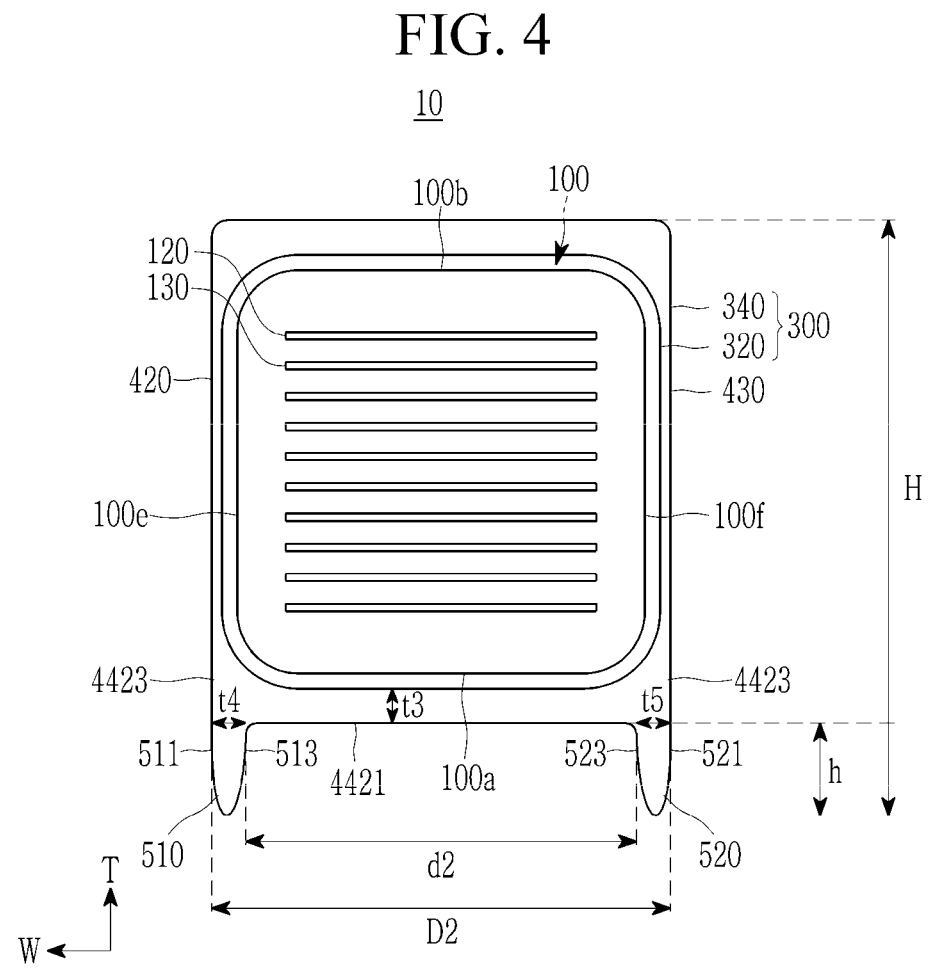
Figure 5:
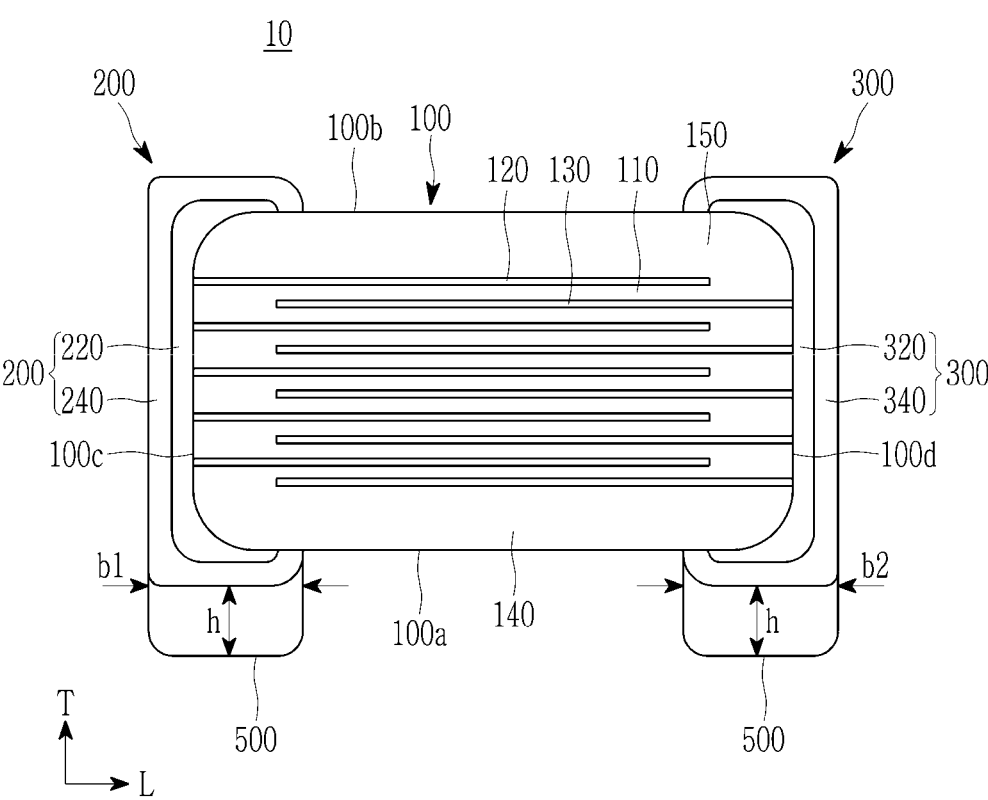
FIG. 5 is a cross-sectional view taken along line V-V' in FIG. 1.

FIG. 1 is a perspective view illustrating an appearance of a multilayer ceramic capacitor according to an embodiment. FIG. 2 is a bottom perspective view illustrating the multilayer ceramic capacitor of FIG. 1. FIG. 3 is a cross-sectional view taken along line III-III' of FIG. 1. FIG. 4 is a cross-sectional view taken along line IV-IV' of FIG. 1. FIG. 5 is a cross-sectional view taken along line V-V' in FIG. 1.

As definitions of directions for clearly describing embodiments, an L-axis, a W-axis, and a T-axis shown in the drawings indicate axes extending in a length direction, in a width direction, and in a thickness direction of a capacitor body 100, respectively. Here, the thickness direction (T-axis direction) is a direction perpendicular to wide surfaces of sheet-like components. As an example, the thickness direction (T-axis direction) may be used as the same concept as the stack direction in which dielectric layers 110 are stacked. The length direction (L-axis direction) is a direction extending parallel to the wide surfaces of the sheet-like components, and may be a direction perpendicular to the thickness direction (T-axis direction). As an example, the length direction (L-axis direction) may be direction in which a first external electrode 200 and a second external electrode 300 are disposed on opposite sides. The width direction (W-axis direction) is a direction extending parallel to the wide surfaces of the sheet-like components, and may be a direction perpendicular to the thickness direction (T-axis direction) and the length direction (L-axis direction).

Referring to FIGS. 1 to 5, a multilayer ceramic capacitor 10 according to the present embodiment includes a capacitor body 100, a plurality of first and second internal electrodes 120 and 130, and first and second external electrodes 200 and 300.

The capacitor body 100 may have a substantially hexahedral shape having a length, a width, and a thickness in a predetermined size along directions intersecting each other, but the present disclosure is not limited thereto. As an example, the capacitor body 100 has a substantially rectangular parallelepiped shape, but portions corresponding to edges or vertices may have a round shape. In addition, the shape and size of the capacitor body 100 and the number of stacked dielectric layers 110 are not limited to what are illustrated in the drawings for the present embodiment.

The capacitor body 100 may have surfaces facing each other in first, second, and third directions, respectively. As an example, the capacitor body 100 may have a first surface and a second surface facing each other in the first direction, a third surface and a fourth surface connecting the first surface and the second surface to each other and facing each other in the second direction, and a fifth surface and a sixth surface connecting the first surface and the second surface to each other, connecting the third surface and the fourth surface to each other, and facing each other in the third direction. For example, the first direction, the second direction, and the third direction may be perpendicular to each other.

In the present embodiment, for convenience of explanation, the first direction of the capacitor body 100 is defined as the thickness direction (T-axis direction), the second direction of the capacitor body 100 is defined as the length direction (L-axis direction), and the third direction of the capacitor body 100 is defined as the width direction (W-axis direction). In addition, opposite surfaces of the capacitor body 100 facing each other in the thickness direction (T-axis direction) are defined as first and second surfaces 100a and 100b, opposite surfaces of the capacitor body 100 connected to the first and second surfaces 100a and 100b and facing each other in the length direction (L-axis direction) are defined as third and fourth surfaces 100c and 100d, and opposite surfaces of the capacitor body 100 connected to the first and second surfaces 100a and 100b, connected to the third and fourth surfaces 100c and 100d, and facing each other in the width direction (W-axis direction) are defined as fifth and sixth surfaces 100e and 100f. As an example, the first surface 100a illustrated as a lower surface in FIGS. 1 and 2 may be a surface facing the mounting direction. In addition, the first to sixth surfaces 100a to 100f may be flat, but are not limited thereto. For example, the first to sixth surfaces 100a to 100f may be curved surfaces with central portions thereof being convex, and edges, which are boundaries between the first to sixth surfaces 100a to 100f may be rounded.

The capacitor body 100 is obtained through a sintering process after stacking a plurality of dielectric layers 110 in the thickness direction (T-axis direction), and includes a plurality of dielectric layers 110 and first and second internal electrodes 120 and 130 alternately arranged in the thickness direction (T-axis direction) with the dielectric layers 110 being interposed therebetween. In this case, the first internal electrodes 120 and the second internal electrodes 130 may have different polarities.

The dielectric layers 110 of the capacitor body 100 may be integrated to an extent in which it is difficult to see a boundary between adjacent dielectric layers without using a scanning electron microscope (SEM).

The capacitor body 100 may include an active region and cover regions 140 and 150 (see FIG. 5).

The active region is a portion contributing to forming a capacitance of the multilayer ceramic capacitor 10. As an example, the active region may be a region in which the first internal electrodes 120 or the second internal electrodes 130 stacked along the thickness direction (T-axis direction) overlap each other.

Referring to FIG. 5, the cover regions 140 and 150 may be disposed to abut on the first surface 100a and the second surface 100b of the active region, respectively, in the thickness direction (T-axis direction) as margin portions. Each of the cover regions 140 and 150 may be formed by stacking a single dielectric layer 110 or two or more dielectric layers 110 on each of upper and lower surfaces of the active region.

The cover regions 140 and 150 may include portions having a different color from the active region. As an example, magnesium (Mg) or vanadium (V) may be added to the dielectric green sheets forming the cover regions 140 and 150 to have a different color from the other dielectric green sheets. If the cover regions 140 and 150 include portions having a different color from the active region, this may be helpful in finding their locations in a process after forming the capacitor body 100, and may make it easier to mount the multilayer ceramic capacitor 10 on a substrate.

The capacitor body 100 may further include side cover regions. The side cover regions may be disposed to abut on the fifth and sixth surfaces of the active region, respectively, in the width direction (W-axis direction) as margin portions. The side cover regions may be formed by stacking and sintering dielectric green sheets after applying conductive paste layers for forming internal electrodes on surfaces of the dielectric green sheets in such a manner that the conductive paste layers are applied only to partial regions of the surfaces of the dielectric green sheets and the conductive paste layers are not applied to both side end regions of the surfaces of the dielectric green sheets.

The cover regions 140 and 150 and the side cover regions serve to prevent damage to the first internal electrodes 120 and the second internal electrodes 130 caused by physical or chemical stress.

As an example, the dielectric layers 110 may include a ceramic material having a high dielectric constant. For example, the dielectric layers 110 may include barium titanate ($BaTiO_3$)-based ceramic powder or the like, but the present disclosure is not limited thereto. The $BaTiO_3$-based ceramic powder is, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which calcium (Ca), zirconium (Zr), or the like is partially dissolved in $BaTiO_3$, but the present disclosure is not limited thereto.

Together with the ceramic powder, a ceramic additive, an organic solvent, a plasticizer, a binder, a dispersant, and the like may be further added to the dielectric layers 110. As an example of the ceramic additive, a transition metal oxide or a transition metal carbide, a rare earth element, magnesium (Mg), aluminum (Al), or the like may be used. As an example, the average thickness of the dielectric layers 110 may be 0.5 µm to 10 µm.

The first internal electrodes 120 and the second internal electrodes 130 are electrodes having different polarities, and may be alternately arranged to face each other in the thickness direction (T-axis direction) with the dielectric layers 110 interposed therebetween. The first internal electrode 120 and the second internal electrode 130 may be electrically insulated from each other by the dielectric layer 110 disposed therebetween.

Ends of the first and second internal electrodes 120 and 130 alternately exposed through the third and fourth surfaces of the capacitor body 100 may be electrically connected to the first and second external electrodes 200 and 300, respectively.

The first and second internal electrodes 120 and 130 may include a conductive metal. As an example, the first and second internal electrodes 120 and 130 may include a metal such as nickel (Ni), copper (Cu), silver (Ag), lead (Pd), gold (Au), or an alloy thereof such as an Ag—Pd alloy, but are limited thereto. In addition, the first and second internal electrodes 120 and 130 may include dielectric particles having the same composition as the ceramic material included in the dielectric layers 110.

According to the above-described configuration, when a predetermined voltage is applied to the first and second external electrodes 200 and 300, charges are accumulated between the first and second internal electrodes 120 and 130 facing each other. At this time, the capacitance of the multilayer ceramic capacitor 10 is proportional to the overlapping area between the first and second internal electrodes 120 and 130 stacked along the thickness direction (T-axis direction) in the active region.

The external electrodes 200 and 300 may be disposed at both ends of the capacitor body 100 in the length direction (L-axis direction). The external electrodes 200 and 300 include a first external electrode 200 and a second external electrode 300. The first external electrode 200 and the second external electrode 300 are electrodes having different polarities, and may be electrically connected to the exposed portions of the first internal electrodes 120 and the second internal electrodes 130, respectively. The external electrodes 200 and 300 may include connection portions 410, side portions 420 and 430, and band portions 440 and 450.

The connection portions 410 may cover the third and fourth surfaces 100c and 100d, which are opposite end surfaces of the capacitor body 100 in the length direction (L), and be electrically connected to the exposed ends of the first and second internal electrodes 120 and 130. The connection portions 410 may include a connection portion 413 disposed in the first external electrode 200 on the third surface and a connection portion 414 disposed in the second external electrode 300 on the fourth surface.

The side portions 420 and 430 may extend from the connection portions 410 to cover partial portions of the fifth and sixth surfaces 100e and 100f of the capacitor body 100 at both ends thereof. The first side portions 420 may extend from the connection portions 410 to cover partial portions of the fifth surface 100e at both ends thereof. The first side portions 420 may include a portion 421 disposed in the first external electrode 200 and a portion 422 disposed in the second external electrode 300. The second side portions 430 may extend from the connection portions 410 to cover partial portions of the sixth surface 100f at both ends thereof. The second side portions 430 may include a portion 431 disposed in the first external electrode 200 and a portion 432 disposed in the second external electrode 300.

The band portions 440 and 450 may extend from the connection portions 410 to cover partial portions of the first and second surfaces 100a and 100b of the capacitor body 100 at both ends thereof and then extend to the side portions 420 and 430. The first band portions 440 may extend from the connection portions 410 to cover partial portions of the first surface 100a of the capacitor body 100 at both ends thereof and then extend to the side portions 420 and 430. The first band portions 440 may include a portion 441 disposed in the first external electrode 200 and a portion 442 disposed in the second external electrode 300. The second band portions 450 may extend from the connection portions 410 to cover partial portions of the second surface 100b of the capacitor body 100 at both ends thereof and then extend to the side portions 420 and 430. The second band portions 450 may include a portion 451 disposed in the first external electrode 200 and a portion 452 disposed in the second external electrode 300.

The first band portions 440 may include first portions 4411 and 4421 extending from the connection portions 410 to cover partial portions of the first surface 100a at both ends thereof, and second portions 4413 and 4423 extending from the first portions 4411 and 4421 to the first and second side portions 420 and 430.

The first band portions 440 may include protruding portions 500. The protruding portions 500 may protrude from the second portions 4413 and 4423 along the thickness direction (T-axis direction) of the capacitor body 100. The protruding portions 500 may be portions disposed to both side surfaces of the capacitor body 100 in the width direction (W-axis direction) and protruding further than the first portions 4411 and 4421.

The protruding portions 500 may include first protruding portions 510 protruding from the second portions 4413 and 4423 extending to the first side portions 420, and second protruding portions 520 protruding from the second portions 4413 and 4423 extending to the second side portions 430.

The protruding portion 500 may have a portion that gradually becomes thinner from a fixed end FI where the protrusion starts to a free end FR. As an example, the protruding portion 500 may be formed so that its thickness at the fixed end FI is maintained and then the protruding portion 500 gradually becomes thinner as being closer to the free end FR.

Outer portions 511 and 521 of the protruding portions 500 may be formed substantially parallel to outer surfaces of the first and second side portions 420 and 430. In addition, the outer portions 511 and 521 of the protruding portions 500 may extend parallel to the outer surfaces of the first and second side portions 420 and 430 and then form curved surfaces closer to the capacitor body 100 as being closer to the free ends FR. Inner portions 513 and 523 of the protruding portions 500 may be formed to correspond to the outer portions 511 and 521. As an example, the outer portions 511 and 521 and the inner portions 513 and 523 may be formed to extend in parallel to each other along the thickness direction (T-axis direction) of the capacitor body 100, and then approach each other as being closer to the free ends FR.

The first protruding portions 510 and the second protruding portions 520 may be formed to correspond to each other. As an example, concerning thicknesses t1, t2, t4 and t5 measured at the fixed ends FI in the width direction (W-axis direction) of the capacitor body 100, the thickness t1 of the first protruding portion 510 and the thickness t2 of the second protruding portion 520 in the first external electrode 200 may be the same, and the thickness t4 of the first protruding portion 510 and the thickness t5 of the second protruding portion 520 in the second external electrode 300 may be the same.

The protruding portions 500 are disposed at both edges relative to the width direction (W-axis direction) of the capacitor body 100, and the thicknesses t1, t2, t4 and t5 of the first protruding portions 510 and the second protruding portions 520 may be determined according to distances d1 and d2 measured between the first protruding portions 510 and the second protruding portions 520 in the width direction (W-axis direction).

The distances d1 and d2 between the first protruding portions 510 and the second protruding portions 520 may be distances between the fixed ends FI of the first and second protruding portions 510 and 520. The distances d1 and d2 between the first protruding portions 510 and the second protruding portions 520 may be set as ratios to lengths D1 and D2 of the first band portions 440 measured along the width direction (W-axis direction). The thicknesses t1, t2, t4, and t5 of the protruding portions 500 may be determined by the distances d1 and d2 between the first protruding portions 510 and the second protruding portions 520. The lengths D1 and D2 of the first band portions may be the sum of the distances d1 and d2 between the first protruding portions 510 and the second protruding portions 520 and the thicknesses t1, t2, t4, and t5 of the protruding portions 500. The length D1 of the first band portion in the first external electrode 200 may be the sum of the distance d1 between the first protruding portion 510 and the second protruding portion 520 and the thicknesses t1 and t2 of the protruding portions 500 in the first external electrode 200. The length D2 of the first band portion in the second external electrode 300 may be the sum of the distance d2 between the first protruding portion 510 and the second protruding portion 520 and the thicknesses t3 and t4 of the protruding portions 500 in the second external electrode 300.

As an example, each of the distances d1 and d2 between the first protruding portions 510 and the second protruding portions 520 may be 80% or more and 95% or less of each of the lengths D1 and D2 of the first band portions. If each of the distances d1 and d2 between the first protruding portions 510 and the second protruding portions 520 is less than 80% of each of the lengths D1 and D2 of the first band portions, the thicknesses t1, t2, t4, and t5 of the protruding portions 500 are thick, which may cause a weak vibration transfer reduction effect. If each of the distances d1 and d2 between the first protruding portions 510 and the second protruding portions 520 is more than 95% of each of the lengths D1 and D2 of the first band portions, the thicknesses t1, t2, t4, and t5 of the protruding portions 500 are thin, which may cause a problem in terms of bonding stability between the substrate and the capacitor. The distances, d1, d2, D1, and D2 may be measured by a microscope such as an optical microscope or a scanning electron microscope (SEM). Other methods and/or tools appreciated by one of ordinary skill in the art, even if not described in the present disclosure, may also be used.

The protruding portions 500 may have portions protruding from the first portions 4411 and 4421. The first protruding portions 510 may have portions protruding from partial portions of the first portions 4411 and 4421 adjacent to the second portions 4413 and 4423 extending to the first side portions 420. The second protruding portions 520 may have portions protruding from partial portions of the first portions 4411 and 4421 adjacent to the second portions 4413 and 4423 extending to the second side portions 430. In this case, the protruding portions 500 may have portions overlapping the capacitor body 100, and the portions overlapping the capacitor body 100 may be portions protruding from the first portions 4411 and 4421. That is, the protruding portions 500 may have portions disposed on the first surface 100a of the capacitor body 100.

The protruding portions 500 may extend to edges of the first band portions 440 in the length direction (L-axis direction) of the capacitor body 100. Widths b1 and b2 of the protruding portions 500 measured in the length direction (L-axis direction) of the capacitor body 100 at the fixed ends FI may be the same as the widths of the first band portions 440 measured in the length direction (L-axis direction) at the fixed ends FI. The widths may be measured by a microscope such as an optical microscope or a scanning electron microscope (SEM). Other methods and/or tools appreciated by one of ordinary skill in the art, even if not described in the present disclosure, may also be used.

As an example, each of heights h of the protruding portions 500 measured along the thickness direction (T-axis direction) of the capacitor body 100 may be in the range of 5% or more and 20% or less of a height H of the multilayer ceramic capacitor 10. That is, each of the heights h of the protruding portions 500 may be in the range of 5% or more and 20% or less of each of heights measured from outer surfaces of the second band portions 450 to the free ends FR of the protruding portions 500 along the thickness direction (T-axis direction) of the capacitor body 100. The height may be measured by a microscope such as an optical microscope or a scanning electron microscope (SEM). Other methods and/or tools appreciated by one of ordinary skill in the art, even if not described in the present disclosure, may also be used.

If each of the heights h of the protruding portions 500 is less than 5% of the height H of the multilayer ceramic capacitor 10, the acoustic noise reduction effect may not be sufficient. If each of the heights h of the protruding portions 500 is more than 20% of the height H of the multilayer ceramic capacitor 10, a problem that the size of the multilayer ceramic capacitor 10 is larger than the standard may occur.

The protruding portions 500 may be formed independently of the shape of the capacitor body 100. As an example, while the capacitor body 100 has no protruding portions except curves naturally generated during the process, the protruding portions 500 may be formed in the first and second external electrodes 200 and 300.

The external electrodes 200 and 300 may include base electrodes 220 and 320 and conductive resin layers 240 and 340. The first external electrode 200 may include a first base electrode 220 and a first conductive resin layer 240. The second external electrode 300 may include a second base electrode 320 and a second conductive resin layer 340.

The first base electrode 220 may be disposed to contact the third surface 100*c* of the capacitor body 100 for connection to the first internal electrodes 120, and the second base electrode 320 may be disposed to contact the fourth surface 100*d* of the capacitor body 100 for connection to the second internal electrodes 130.

The first and second base electrodes 220 and 320 may be formed in the external electrodes 200 and 300 to correspond to the surface shapes of the capacitor body 100. As an example, the first and second base electrodes 220 and 320 may be formed to be substantially parallel to the surfaces of the capacitor body 100 at a constant thickness. That is, the first and second base electrodes 220 and 320 may be formed flat, and may have no protruding portions. Although the first and second base electrodes 220 and 320 are described as having no protruding portions, this means that there are no protruding portions that are intentionally shaped, and does not exclude curves naturally formed on the surfaces of the first and second base electrodes 220 and 320 during the process.

The first and second base electrodes 220 and 320 may include copper (Cu). In addition, the first and second base electrodes 210 and 310 may contain copper (Cu) as a main component, and include glass and one or more of nickel (Ni), tin (Sn), palladium (Pd), platinum (Pt), gold (Au), silver (Ag), tungsten (W), titanium (Ti), lead (Pb), and an alloy thereof.

As an example of a method for forming the first and second base electrodes 220 and 320, the first and second base electrodes 220 and 320 may be formed by dipping the capacitor body 100 into a conductive paste including conductive metal and glass, printing the conductive paste on the surfaces of the capacitor body 100 using a screen printing technique or a gravure printing technique, applying the conductive paste onto the surfaces of the capacitor body 100, or transferring dried films obtained by drying the conductive paste onto the capacitor body 100.

While maintaining sufficient conductivity by forming the first and second base electrodes 220 and 320 using the above-described conductive paste, penetration of plating solution and/or external moisture can be effectively suppressed by the added glass increasing the density of the first and second external electrodes 200 and 300.

As an example, the glass component included in the first and second base electrodes 220 and 320 may have a composition in which oxides are mixed, and may be one or more selected from the group consisting of a silicon oxide, a boron oxide, an aluminum oxide, a transition metal oxide, an alkali metal oxide, and an alkaline earth metal oxide. The transition metal may be one or more selected from the group consisting of zinc (Zn), titanium (Ti), copper (Cu), vanadium (V), manganese (Mn), iron (Fe), and nickel (Ni), the alkali metal may be one or more selected from the group consisting of lithium (Li), sodium (Na), and potassium (K), and the alkaline earth metal may be one or more selected from the group consisting of magnesium (Mg), calcium (Ca), strontium (Sr), and barium (Ba).

The conductive resin layers 240 and 340 may be disposed on outer sides of the base electrodes 220 and 320. The conductive resin layers 240 and 340 may be formed to partially or entirely cover the base electrodes 220 and 320. The first conductive resin layer 240 may be formed to at least partially cover the first base electrode 220 or entirely cover the first base electrode 220, and the second conductive resin layer 340 may be formed to at least partially cover the second base electrode 320 or entirely cover the second base electrode 320.

The conductive resin layers 240 and 340 may be disposed on the connection portions 410, the first side portions 420, the second side portions 430, the first band portions 440, and the second band portions 450.

The thicknesses of the conductive resin layers 240 and 340 may be set in consideration of various factors including the size of the multilayer ceramic capacitor 10 and the adhesion strength of the conductive resin layers 240 and 340. In this case, the thicknesses of the conductive resin layers 240 and 340 may be measured from the outer surfaces of the base electrodes 220 and 320 to the outer surfaces of the conductive resin layers 240 and 340 in a direction perpendicular to the outer surfaces of the base electrodes 220 and 320. As an example, a maximum value t3 of the thicknesses of the conductive resin layers 240 and 340 disposed in the first portions 4411 and 4421 of the first band portions 440 where the protruding portions 500 do not protrude on the first surface 100*a* of the capacitor body 100 may be 10 μm or less (excluding 0). The thickness may be measured by a microscope such as an optical microscope or a scanning electron microscope (SEM). Other methods and/or tools appreciated by one of ordinary skill in the art, even if not described in the present disclosure, may also be used.

The conductive resin layers 240 and 340 may include the protruding portions 500. The protruding portions 500 may be disposed only in the conductive resin layers 240 and 340 and may not be disposed in the base electrodes 220 and 320. The protruding portions 500 may protrude further than the first portions 4411 and 4421 along the thickness direction (T-axis direction) of the capacitor body 100 from the conductive resin layers 240 and 340 disposed in the second portions 4413 and 4423 of the first band portions 440. Partial portions of the protruding portions 500 may protrude from the first portions 4411 and 4421 disposed on the first surface 100*a* of the capacitor body 100.

Figure 6:
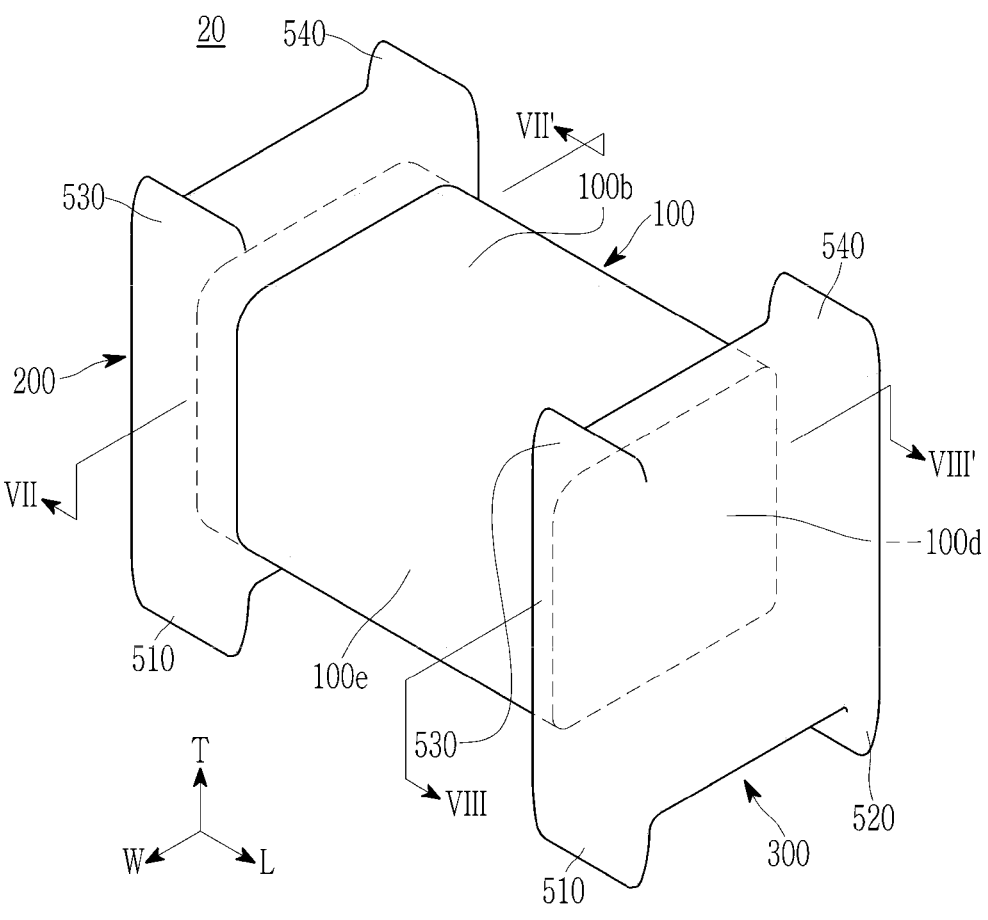
FIG. 6 is a perspective view illustrating an appearance of a multilayer ceramic capacitor according to another embodiment.
Figure 7:
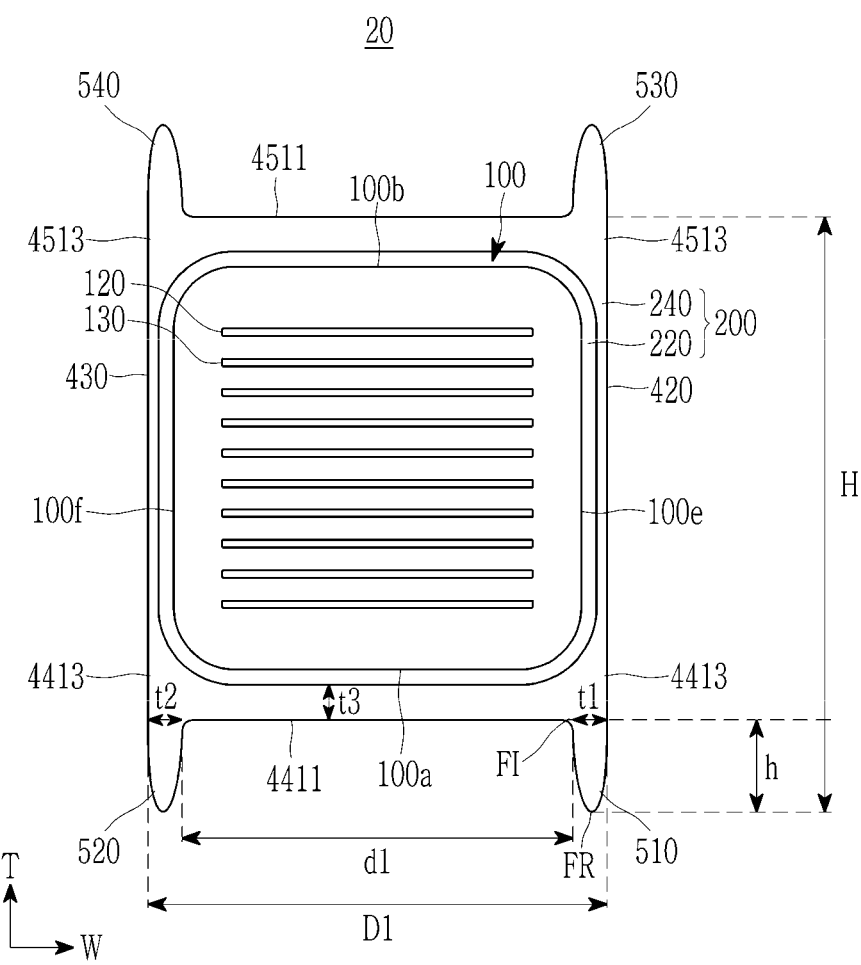
FIG. 7 is a cross-sectional view taken along line VII-VII' in FIG. 6.
Figure 8:
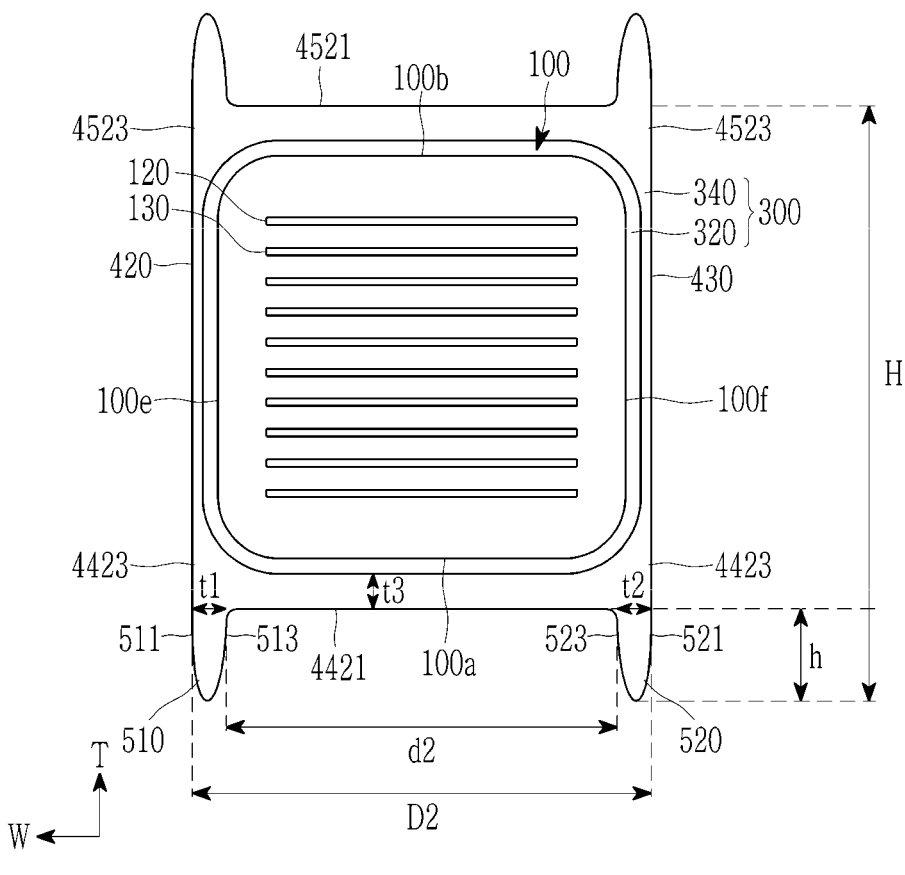
FIG. 8 is a cross-sectional view taken along line VIII-VIII' in FIG. 6.

FIG. 6 is a perspective view illustrating an appearance of a multilayer ceramic capacitor according to another embodiment. FIG. 7 is a cross-sectional view taken along line VII-VII' of FIG. 6. FIG. 8 is a cross-sectional view taken along line VIII-VIII' of FIG. 6.

Referring to FIGS. 6 to 8, the multilayer ceramic capacitor according to the present embodiment is similar to the multilayer ceramic capacitor according to the embodiment described with reference to FIGS. 1 to 5. Detailed descriptions of the same components will be omitted.

The multilayer ceramic capacitor 20 according to the present embodiment may further include third and fourth protruding portions 530 and 540 disposed in the second band portions 450.

The second band portions 450 may include third portions 4511 and 4521 extending from the connection portions 410 to cover partial portions of the second surface 100*b* at both ends thereof, and fourth portions 4513 and 4523 extending from the third portions 4511 and 4521 to the first and second side portions 420 and 430.

The third and fourth protruding portions 530 and 540 may be disposed on the conductive resin layers 240 and 340 of the second band portions 450. The third protruding portions 530 may protrude from the fourth portions 4513 and 4523 connected to the first side portions 420. The fourth protruding portions 540 may protrude from the fourth portions 4513 and 4523 connected to the second side portions 430.

The third and fourth protruding portions 530 and 540 may protrude from the fourth portions 4513 and 4523 along the thickness direction (T-axis direction) of the capacitor body 100 in a direction opposite to the direction in which the first and second protruding portions 510 and 520 protrude. That is, the third and fourth protruding portions 530 and 540 may be portions disposed to abut on both side surfaces of the second band portions 450 in the width direction (W-axis direction) of the capacitor body 100 and protruding further than the third portions 4511 and 4521.

The third and fourth protruding portions 530 and 540 may be formed to correspond to the first and second protruding portions 510 and 520. For example, the third and fourth protruding portions 530 and 540 may correspond to the first and second protruding portions 510 and 520 in position and shape.

Figure 9:
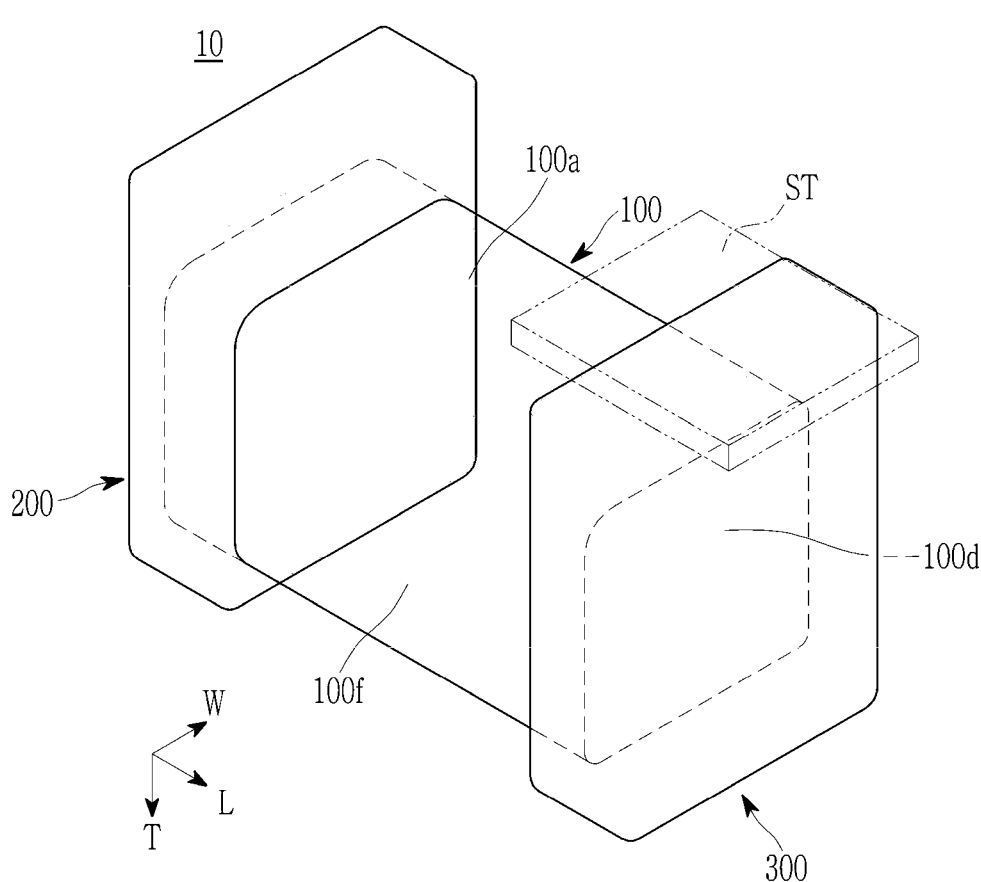
FIG. 9 is a perspective view for explaining a method of manufacturing a multilayer ceramic capacitor using a molding body.
Figure 10:
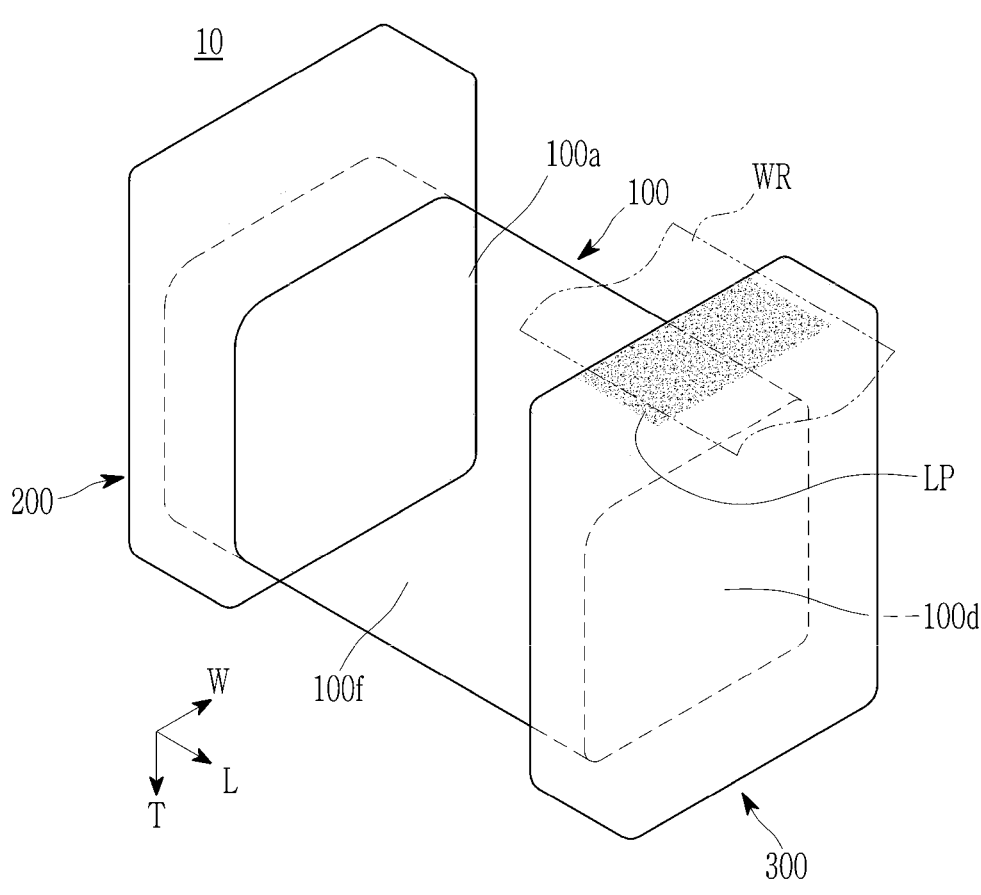
FIG. 10 is a perspective view for explaining a method of manufacturing a multilayer ceramic capacitor using lapping.

Hereinafter, a method of manufacturing a multilayer ceramic capacitor according to an embodiment will be described with reference to FIGS. 9 and 10 together with FIGS. 1 to 8. FIG. 9 is a perspective view for explaining a method of manufacturing a multilayer ceramic capacitor using a molding body. FIG. 10 is a perspective view for explaining a method of manufacturing a multilayer ceramic capacitor using lapping.

The method of manufacturing the multilayer ceramic capacitor according to the present embodiment may include forming a capacitor body 100 in which dielectric layers 110 and internal electrodes 120 and 130 are stacked with the dielectric layers 110 being interposed between the internal electrodes 120 and 130, and forming external electrodes on outer sides of the capacitor body 100. The capacitor body 100 may have a first surface 100$a$ and a second surface 100$b$ disposed to face each other in a direction in which the internal electrodes 120 and 130 are stacked.

The forming of the capacitor body 100 may include forming conductive paste layers on surfaces of dielectric green sheets, stacking the dielectric green sheets to produce a dielectric green sheet laminate, and sintering the dielectric green sheet laminate.

A plurality of dielectric green sheets are prepared. The dielectric green sheets become the dielectric layers 110 of the capacitor body 100 after the sintering process.

The dielectric green sheet may be prepared by mixing ceramic powder, a ceramic additive, an organic solvent, a plasticizer, a binder, a dispersant, etc. to prepare a paste, and forming the paste into a sheet shape at a thickness of several μm through a doctor blade or screen printing technique or the like.

As an example, the ceramic powder may include dielectric ceramic containing a component such as $BaTiO_3$, $CaTiO_3$, $SrTiO_3$, or $CaZrO_3$. In addition to such a component, the dielectric ceramic may further contain an auxiliary component such as a Mn compound, an Fe compound, a Cr compound, a Co compound, or a Ni compound. For example, the ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which Ca, Zr, or the like is partially dissolved in the $BaTiO_3$-based dielectric ceramic.

As an example of the ceramic additive, a transition metal oxide or a transition metal carbide, a rare earth element, magnesium (Mg), or aluminum (Al) may be used.

Some of the dielectric green sheets may be prepared to have a different color from other dielectric green sheets. As an example, some of the dielectric green sheets may be prepared by adding a component such as magnesium (Mg) or vanadium (V). Some of the colored dielectric green sheets may form at least partial portions of the cover regions 140 and 150 of the capacitor body 100.

Conductive paste layers are formed on surfaces of the dielectric green sheets. The conductive paste layers become the first and second internal electrodes 120 and 130 after the sintering process.

The conductive paste layers may be formed by applying a conductive paste containing a conductive metal to the surfaces of the dielectric green sheets using a doctor blade or screen printing technique or the like.

The conductive metal may include, for example, a metal such as Ni, Cu, Ag, Pd, Au, or an alloy thereof such as an Ag—Pd alloy.

As an example, first conductive paste layers may be applied in a first pattern to surfaces of first dielectric green sheets, and second conductive paste layers may be applied in a second pattern to surfaces of second dielectric green sheets. The first pattern and the second pattern may be aligned in such a manner that when the first and second dielectric green sheets are alternately stacked, partial portions of the first and second conductive paste layers overlap each other and the other portions of the first and second conductive paste layers do not overlap each other.

A dielectric green sheet laminate is produced by stacking the first and second dielectric green sheets. The first and second dielectric green sheets are stacked in such a manner that although the first and second conductive paste layers overlap, at least partial portions of the first and second conductive paste layers do not overlap each other.

Optionally, the dielectric green sheet laminate is compressed.

The dielectric green sheet laminate may be cut so that the first and second conductive paste layers are exposed through both end surfaces thereof, respectively. An end of each of the first and second internal electrodes 120 and 130 may be exposed to one of the both end surfaces of the dielectric green sheet laminate.

The capacitor body 100 is produced by sintering the dielectric green sheet laminate at a high temperature.

The forming of the external electrodes 200 and 300 on the outer sides of the capacitor body 100 may include forming base electrodes 220 and 320 to be connected to the internal electrodes 120 and 130, and forming laminates for conductive resin layers on the base electrodes 220 and 320.

The first and second base electrodes 220 and 320 are formed on both end surfaces of the capacitor body 100 to which the first and second internal electrodes 120 and 130 are exposed, respectively. The first and second base electrodes 220 and 320 may be formed by dipping the capacitor body 100 into a conductive paste containing a conductive metal. As another example, the first and second base electrodes 220 and 320 may be formed by printing the conductive paste on the surfaces of the capacitor body 100 using a screen printing technique or a gravure printing technique, applying the conductive paste onto the surfaces of the capacitor body 100, or transferring dried films obtained by drying the conductive paste onto the capacitor body 100.

Laminates for conductive resin layers may be formed on the outer surface of the capacitor body 100 on which the base electrodes 220 and 320 are formed. The laminates for conductive resin layers may include an epoxy resin and conductive metal particles.

The laminates for conductive resin layers may include a liquid paste. The laminates for conductive resin layers may be formed by dipping the capacitor body 100 on which the base electrodes 220 and 320 are formed into the paste, or applying this paste to the surfaces of the capacitor body 100 on which the base electrodes 220 and 320 are formed.

Referring to FIG. 9, first and second protruding portions 510 and 520 may be formed using a molding body ST before the laminates for conductive resin layers, which are the liquid paste, are cured. The molding body ST may have a flat plate-like shape. The molding body ST may have a width larger than the widths of the first band portions 440 measured in the length direction (L-axis direction) of the internal electrodes 120 and 130. In addition, the molding body ST may have a length of 80% or more and 95% or less of each of the lengths D1 and D2 of the first band portions 440 measured in the width direction (W-axis direction) of the capacitor body 100. The molding body ST may be pressed onto the laminates after being positioned at the central portion of each of the laminates for conductive resin layers, which are the liquid paste. The pressed portions may be concavely depressed, and portions around the pressed portions may protrude such that the first and second protruding portions 510 and 520 are formed.

As another example, the first and second protruding portions 510 and 520 may be formed using lapping after curing the laminates for conductive resin layers, which the liquid paste. As an example, referring to FIG. 10, the first and second protruding portions 510 and 520 may be formed by shaving off the cured laminates for conductive resin layers with lapping particles LP placed on the surfaces of laminates for conductive resin layers and subjected to relative motion while being pressed by a lap.

As another example, solid sheets including epoxy may be used as the laminates for conductive resin layers. As an example, the first and second protruding portions 510 and 520 may be formed using lapping after adhering solid sheets to the outer surfaces of the capacitor body 100 on which the base electrodes 220 and 320 are formed.

As described above, after the first and second protruding portions 510 and 520 are formed, third and fourth protruding portions 530 and 540 may be optionally formed on the second band portions 450. The formation of the third and fourth protruding portions 530 and 540 is the same as the formation of the first and second protruding portions 510 and 520, except that the third and fourth protruding portions 530 and 540 are formed on the second band portions 450. Therefore, redundant descriptions will be omitted.

The multilayer ceramic capacitor and the method of manufacturing the same according to the embodiments described above are capable of reducing transfer of vibration from the multilayer ceramic capacitor 10 to a substrate, because the capacitor body 100 is spaced apart from the substrate when the multilayer ceramic capacitor 10 is mounted on the substrate. By reducing transfer of vibration in this manner, it is possible to reduce acoustic noise caused by the vibration of the multilayer ceramic capacitor 10. In addition, vibration can be suppressed as the flow area and the height of solder welded when the multilayer ceramic capacitor 10 is mounted on the substrate decrease. Accordingly, the acoustic noise may be additionally reduced. In addition, since the protruding portions 500 are formed by directly molding the conductive resin layers 240 and 340 without introducing an additional process for manufacturing an interposer or the like for reducing acoustic noise, production cost can be reduced, while mass production efficiency increases.

Although the preferred embodiments of the present disclosure have been described above, the present disclosure is not limited thereto, and various modifications may be made within the scope of the claims, the specification, and the accompanying drawings, which also fall within the scope of the present disclosure.

What is claimed is:

1. A multilayer ceramic capacitor comprising:
   a capacitor body having first and second surfaces facing each other in a first direction, third and fourth surfaces facing each other in a second direction and connecting the first and second surfaces to each other, and fifth and sixth surfaces facing each other in a third direction, connecting the first and second surfaces to each other, and connecting the third and fourth surfaces to each other, the capacitor body including dielectric layers, and first and second internal electrodes alternately disposed in the first direction with one of the dielectric layers interposed between one of the first internal electrodes and one of the second internal electrodes; and
   external electrodes each including a base electrode disposed on an outer side of the capacitor body and connected to the first internal electrodes or the second internal electrodes, and a conductive resin layer disposed on an outer side of the base electrode, the external electrodes each comprising:
      a connection portion covering the third surface or the fourth surface;
      a side portion extending from the connection portion to cover (i) a partial portion of the fifth surface and ends thereof or (ii) a partial portion of the sixth surface and ends thereof;
      a first band portion including:
         a first portion extending from the connection portion to cover a partial portion of the first surface and ends thereof, and
         a second portion extending from the first portion to the side portion; and
      a second band portion extending from the connection portion to cover a partial portion of the second surface and ends thereof and extending to the side portion, and
   wherein the conductive resin layer disposed in the second portion includes a protruding portion that protrudes further, and has a greater thickness, than the first portion along the first direction of the capacitor body.

2. The multilayer ceramic capacitor of claim 1, wherein the capacitor body has no protruding portion corresponding to the protruding portion included in the conductive resin layer.

3. The multilayer ceramic capacitor of claim 1, wherein a maximum value of a thickness of the conductive resin layer disposed in the first portion of the first band portion is 10 μm or less, the thickness of the conductive resin layer is measured from an outer surface of the base electrode on which the conductive resin layer is disposed to an outer surface of the conductive resin layer in a direction perpendicular to the outer surface of the base electrode.

4. The multilayer ceramic capacitor of claim 1, wherein the side portion includes:
   a first side portion extending from the connection portion to cover a partial portion of the fifth surface and ends thereof, and
   a second side portion extending from the connection portion to cover a partial portion of the sixth surface and ends thereof, and the protruding portion includes:

a first protruding portion protruding from the second portion of the first band portion which extends to the first side portion, and a second protruding portion protruding from the second portion of the first band portion which extends to the second side portion.

5. The multilayer ceramic capacitor of claim 4, wherein a distance between a fixed end of the first protruding portion and a fixed end of the second protruding portion measured along the third direction is 80% or more and 95% or less of a length of the first band portion measured along the third direction.

6. The multilayer ceramic capacitor of claim 4, wherein the conductive resin layer disposed in the second band portion further includes third and fourth protruding portions protruding along the first direction in a direction opposite to the direction in which the first and second protruding portions protrude.

7. The multilayer ceramic capacitor of claim 6, wherein the third protruding portion and the fourth protruding portion correspond to the first protruding portion and the second protruding portion, respectively.

8. The multilayer ceramic capacitor of claim 1, wherein at least a part of the protruding portion is disposed on the first surface.

9. The multilayer ceramic capacitor of claim 1, wherein a width of the protruding portion measured along the second direction at a fixed end of the protruding portion is equal to a width of the first band portion measured along the second direction at the fixed end of the protruding portion.

10. The multilayer ceramic capacitor of claim 1, wherein a height of the protruding portion measured along the first direction is in a range of 5% or more and 20% or less of a height measured along the first direction from an outer surface of each of the second band portions to a free end of the protruding portion.

11. The multilayer ceramic capacitor of claim 1, wherein the capacitor body further includes a cover region disposed between (i) the first surface and (ii) one of the first internal electrodes or the second internal electrodes, and the cover region includes a portion having a different color from the dielectric layers disposed between the first internal electrodes and the second internal electrodes.

12. The multilayer ceramic capacitor of claim 11, wherein the cover region includes magnesium or vanadium.

13. The multilayer ceramic capacitor of claim 1, wherein the protruding portion has a tapered end that points in the first direction.

* * * * *